(12) United States Patent
Johnston

(10) Patent No.: US 6,973,895 B2
(45) Date of Patent: Dec. 13, 2005

(54) ANIMAL FEEDING AND WATERING APPARATUS

(76) Inventor: Donald William Johnston, 4661 N. Woodson, Fresno, CA (US) 93705

( * ) Notice: Subject to any disclaimer, the term of this patent is extended or adjusted under 35 U.S.C. 154(b) by 0 days.

(21) Appl. No.: 10/636,463

(22) Filed: Aug. 6, 2003

(65) Prior Publication Data

US 2005/0028750 A1 Feb. 10, 2005

(51) Int. Cl.[7] .............................. A01K 7/04; A01K 5/01
(52) U.S. Cl. ....................... 119/51.5; 119/61.53; 119/78
(58) Field of Search ................................ 119/51.5, 52.1, 119/51.01, 52.3, 53, 475, 476, 464, 72, 74, 78, 61.5, 61.53

(56) References Cited

U.S. PATENT DOCUMENTS

| | | | |
|---|---|---|---|
| 1,028,998 A | | 6/1912 | Eaton |
| 1,488,086 A | | 3/1924 | Zieglowsky |
| 1,552,076 A | * | 9/1925 | Mosier ........................ 119/72 |
| 1,854,117 A | | 4/1932 | Devitt |
| 2,543,465 A | | 2/1951 | Morey |
| 2,665,366 A | | 1/1954 | Cleveland |
| 3,368,580 A | | 2/1968 | Carter |
| 3,371,652 A | | 3/1968 | Louks et al. |
| 3,437,075 A | * | 4/1969 | Hawes et al. ............... 119/57.2 |
| 3,450,101 A | * | 6/1969 | Avrea ....................... 119/51.11 |
| 3,759,228 A | | 9/1973 | Keen |
| 3,841,268 A | | 10/1974 | Bunger |
| 4,128,080 A | * | 12/1978 | Haney ........................ 119/51.5 |
| 4,470,371 A | | 9/1984 | Strickland |
| D278,371 S | | 4/1985 | Strickland |
| 4,688,520 A | * | 8/1987 | Parks ........................ 119/51.11 |
| 4,947,796 A | * | 8/1990 | Robinette ................... 119/51.5 |
| D312,335 S | | 11/1990 | Spruell |
| 5,125,363 A | * | 6/1992 | McGaha ..................... 119/51.5 |
| 5,165,365 A | * | 11/1992 | Thompson ............... 119/61.53 |
| 5,253,609 A | * | 10/1993 | Partelow et al. .......... 119/61.53 |
| 5,277,149 A | * | 1/1994 | East ........................... 119/51.5 |
| 5,467,738 A | * | 11/1995 | Cass ........................ 119/61.53 |
| 5,819,686 A | * | 10/1998 | Credeur ..................... 119/51.5 |
| 5,904,117 A | * | 5/1999 | Castro ....................... 119/51.5 |
| 6,125,790 A | * | 10/2000 | Breedwell ................. 119/51.5 |
| 6,142,099 A | * | 11/2000 | Lange, Jr. .................. 119/51.5 |
| 6,167,840 B1 | * | 1/2001 | White et al. ............. 119/61.53 |
| 6,257,288 B1 | * | 7/2001 | Davidian et al. ........... 141/324 |

* cited by examiner

Primary Examiner—Yvonne R. Abbott
(74) Attorney, Agent, or Firm—Richard A. Ryan

(57) ABSTRACT

An apparatus for supplying food and water to animals having a feeding component with an upper reservoir for receiving food therein, a watering component with a lower reservoir for receiving water therein and a water control system having a fluid level regulator to maintain the level of water in the lower reservoir. The upper reservoir is removably supported above the lower reservoir by a support mechanism interconnecting the feeding and watering components. In one configuration, the support mechanism is a post attached to the bottom of the upper reservoir sized and configured to be received in a post connector at the bottom of the lower reservoir. The fluid level regulator can comprise a float level system having a fluid valve connected to float by an actuating arm. A hose can be connected to a connector at an inlet on one of the lower reservoir's sidewalls.

8 Claims, 3 Drawing Sheets

ANIMAL FEEDING AND WATERING APPARATUS

CROSS-REFERENCE TO RELATED APPLICATIONS

Not Applicable.

BACKGROUND OF THE INVENTION

A. Field of the Invention

The field of the present invention relates generally to apparatuses used to provide food and water to animals, particularly dogs, cats and other pets. More specifically, the present invention relates to such apparatuses that have a food container portion provided with an automatic water dispenser portion. Even more specifically, the present invention relates to such apparatuses that are configured to prevent crawling insects, such as ants and the like, from getting into the supply of food.

B. Background

Many people have animals that live in and around their home, often in the backyard or other outdoor areas adjacent the home. With regard to domesticated animals, particularly pets such as dogs, cats and the like, the animal typically depends on their human owners for food and water. Generally, the person feeds the animals on a regular basis and supplies water on an as needed basis (i.e., as the water level in the water container becomes low). When feeding their animal, people commonly feed the animal once or twice a day at or about the same time each day and typically provide the animal with more food than it can eat at a single sitting. As a result, some portion of the food tends to sit in the food dish for an extended period of time. When the animal's owner or caretaker is going to be away from the home for more than a day or so, it is very common for them to place more than one day's food supply in the food container so that the animal may eat the food when it is hungry. When taking care of multiple animals, such as several dogs, the problem of food remaining in the food dish for extended periods of time is exasperated due to the fact that enough food is needed for all the animals and that they often do not eat the same amount at the same time. In certain parts of the country, particularly the Southwest where the weather is often warm or hot, water does not remain in the water container for very long. Between the animals needing more water to drink due to the heat and the normal process of evaporation, the water container is often very low and must be checked and refilled several times a day, particularly when utilized with multiple animals. When the pet's owner or caretaker will be away, he or she must either place out multiple water containers or make arrangements with a relative or neighbor to check and refill the water container(s). Failure to do so can result in injury or death to the animals.

One particular problem with leaving food in the animal's food dish for any period of time is that the food often becomes infested with ants and/or other crawling insects. Although this problem is particularly a concern when the owner or caretaker will be gone and has to leave more than one day's food supply out for his or her animals, it is also a concern for animals that are fed every day due to the food that is not consumed at a single sitting. As is well known, even when the food dish appears empty there are sufficient scraps to attract insects to the food dish. For various reasons, the animal's owner or caretaker will typically wash out the food dish or take other appropriate action to remove the insects from the food dish before refilling it with food. When some of the previous day's food remains in the food dish it will typically be completely infested by insects, making the cleaning of the food dish prior to refilling that much more difficult. Often this involves removing the food dish from the feeding area and taking it to an outdoor faucet or hose or bringing it indoors to wash it out in order to provide the animals with a clean dish for their food. Besides the fact that this task is often quite unpleasant, particularly if the food dish has food remaining in it that is full of ants or other potentially biting insects, it is time consuming and can result in the owner/caretaker getting wet or having food and insects splashed on his or her person. In addition to insect infestation of the food dish being a problem for the animal's food and the feeding activity, the food dish also attracts insects to the area used to feed the animals, resulting in the area being more prone to insect problems.

A number of combination feeding and watering apparatuses are known. For example, U.S. Pat. No. 4,128,080 to Haney describes an animal feeder that utilizes the animal's water container as a moat or barrier to crawling insects so as to keep insects out of an animal's food supply. In this patent, the food dish is mounted to and above the water container by a non-circular post extending upwardly from the water container that has a bracket which connects to and supports the food dish in an off-center position so the food dish only extends to one side of the post in order to provide the animal with easy access to most of the water container. U.S. Pat. No. 2,543,465 to Morey discloses a combination feeding and watering device for animals that utilizes a lower food dish having a removable water container threadably received in the food dish and extending upwardly therefrom. While this apparatus does supply both food and water to animals and appears to prevent the animals from spilling the water container, it does not prevent insects from crawling into the food dish. Another combination feeding and watering apparatus is disclosed in U.S. Pat. No. 3,450,101 to Avrea. In this apparatus, food is stored in a feed reservoir that supplies food to an extendable tray on a pre-set or automatic basis, such as a timer or the like, that utilizes water pressure to move the tray in and out. A separate watering container, having a float valve, is connected to the supply of water to provide water to the animal. No provision is made in this apparatus, particularly in a moat fashion, to keep insects out of the food dish. Although patents describing float-controlled watering devices have long been available, such as U.S. Pat. No. 1,028,998 (which issued in 1912), utilizing various types of float valve mechanisms to maintain the water in the water container at a certain water level, none of the known devices have been combined with feeding apparatuses configured to keep insects out of the food dish. Examples of such float-controlled patents include U.S. Pat. No. 4,470,371 to Strickland, U.S. Pat. No. 3,841,268 to Bunger and U.S. Pat. No. 3,759,228 to Keen. The patents described above are representative of feeding and/or watering apparatuses known in the prior art.

Although the prior art discloses a number of pet feeding and/or watering apparatuses, there are certain characteristics of the known apparatuses that limit their complete acceptance, usefulness and/or cost effectiveness. For instance, it is well known that the apparatuses that do not provide for the exclusion of insects are subject to the aforementioned problems with regard to insect infestation. In addition, the apparatuses that only provide a watering system are not easily or effectively adaptable to use as a feeding apparatus, therefore requiring a second feeding dish that is not protected from crawling insects, thereby limiting their effectiveness. Some of the previously referenced apparatuses utilize relatively complicated mechanisms that are likely to be expensive to manufacture and more likely to have a tendency to malfunction or otherwise break. What is needed, therefore, is a combined animal feeding and watering apparatus that substantially prevents the infestation of crawling insects into the feeding dish or reservoir and provides for automatic maintenance of the water level in the water container or reservoir. The apparatus should be relatively inexpensive to manufacture, simple to utilize and have an easily removed feeding dish to facilitate its cleaning, as may be necessary or desired.

SUMMARY OF THE INVENTION

The animal feeding and watering apparatus of the present invention solves the problems and provides the benefits identified above. That is to say, the present invention discloses a feeding and watering apparatus particularly configured to provide both a food reservoir and a water reservoir that substantially prevents crawling insects from getting into the food reservoir and provides automatic maintenance of the desired water level in the water reservoir. The feeding and watering apparatus of the present invention can be made out of a wide variety of materials and in a wide variety of shapes and sizes. In the preferred embodiment, the food reservoir component is easily removed from the apparatus so the animal owner/caretaker can clean and, if desired, refill the food reservoir with animal food.

In one aspect of the present invention, the animal feeding and watering apparatus has a feeding component comprising an upper reservoir with a bottom and a plurality of generally upstanding sidewalls that is configured to receive and contain food and a watering component comprising a lower reservoir with a bottom and a plurality of generally upstanding sidewalls configured to store water therein. Connecting the upper and lower reservoirs a support mechanism configured to removably support the upper reservoir above the lower reservoir. The lower reservoir is sized and configured to be larger than the upper reservoir to allow the one or more animals to access the water in the lower reservoir without substantially contacting the upper reservoir. A water control system, attached to the lower reservoir, has a fluid level regulator operatively connected to a supply of water so as to automatically maintain a predetermined level of water in the lower reservoir. Preferably, a typical garden hose or the like can releasably connect to the fluid level regulator to supply water to the lower reservoir. The fluid level regulator can be of the float-controlled type having a fluid valve, actuating arm and float mechanism. A screen can be utilized to protect the fluid level regulator from damage or unintended changes to the set water level. In use, the apparatus of the present invention prevents the infestation of crawling insects into the food in the upper reservoir and automatically maintains the water level in the lower reservoir.

Various support mechanisms can be utilized with the apparatus of the present invention. For instance, the apparatus can have one or more downwardly projecting cylindrical post members attached to the bottom of the upper reservoir that are sized and configured to be received in one or more upwardly projecting tubular post connectors attached to the bottom of the lower reservoir. Alternatively, the support mechanism can comprise a plate member attached to one or more post members projecting upwardly from the bottom of the lower reservoir and one or more clip members attached to the upper reservoir, the plate member being sized and configured to substantially fit within the clip member and support the upper reservoir. Alternatively, the location of the post members and post connectors or the plate members and clip members can be switched.

Accordingly, the primary objective of the present invention is to provide an improved animal feeding and watering apparatus that provides the advantages discussed above and that overcomes the disadvantages and limitations associated with presently available animal feeding and watering apparatuses.

It is also an important objective of the present invention to provide a combined animal feeding and watering apparatus that substantially prevents the infestation of crawling insects into the feeding compartment or reservoir.

It is also an important objective of the present invention to provide a combined animal feeding and watering apparatus that substantially maintains the water level in the water compartment or reservoir.

It is also an important objective of the present invention to provide an animal feeding and watering apparatus that substantially prevents the infestation of crawling insects in the food reservoir while maintaining the water level in the water reservoir.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the animal feeding and watering apparatus of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 3:
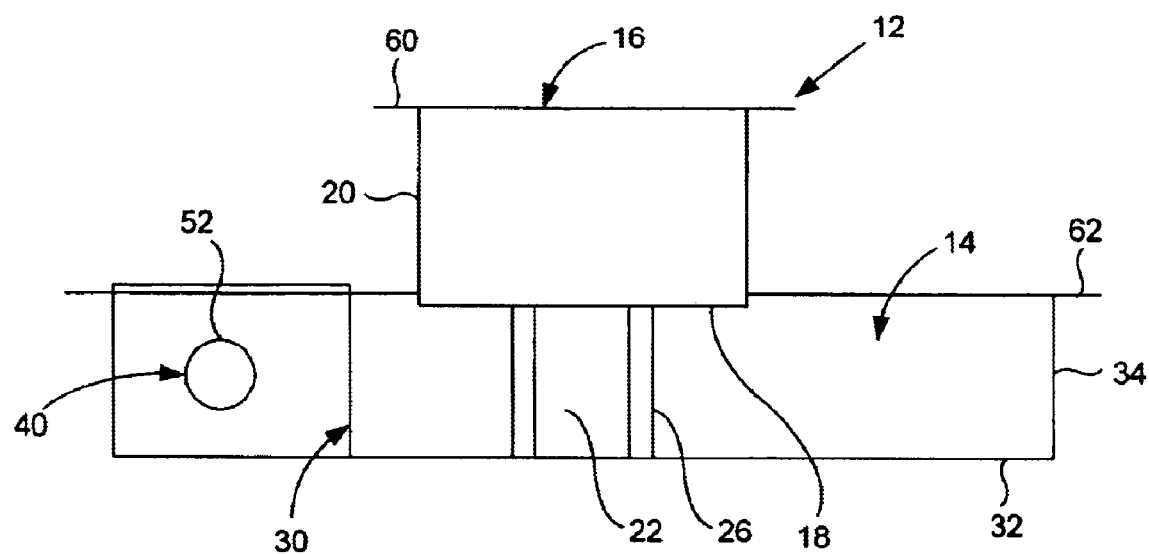
FIG. 3 is a side section view of the feeding and watering apparatus of FIG. 1 with the upper and lower lips added and fluid level regulator removed.
Figure 4:
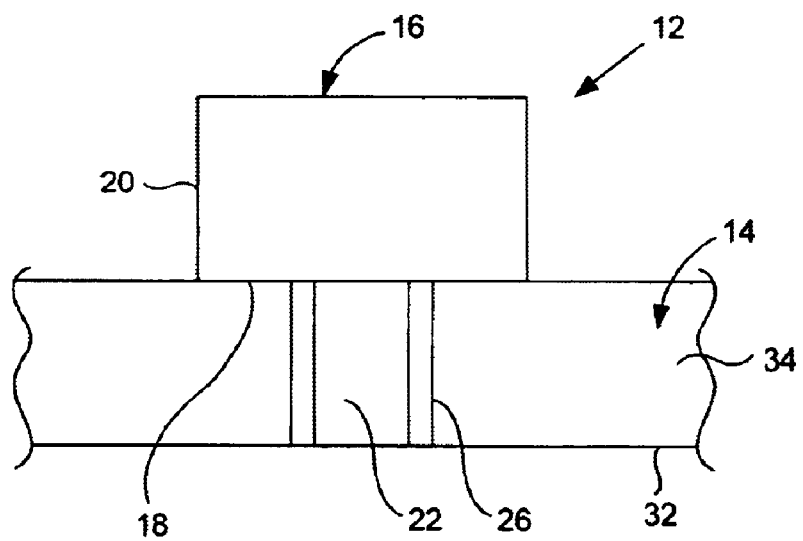
FIG. 4 is a partial side section view similar to FIG. 3 of an alternative embodiment of the animal feeding and watering apparatus of the present invention.

A preferred embodiment of the feeding and watering apparatus of the present invention, identified generally as 10 in the figures, primarily comprises a feeding component 12 and a cooperatively engaged watering component 14 configured to provide food and water to animals, particularly domesticated animals such as dogs, cats and other pets. In the preferred embodiment of the feeding and watering apparatus 10 of the present invention, feeding component 12 comprises an upper reservoir 16 having a substantially horizontal bottom 18 which is bounded on its periphery by a plurality of generally vertically displaced sidewalls 20, such as the four shown in the figures. As best shown in FIG. 3, upper reservoir 16 can be formed into a generally square or rectangular shaped compartment having an upwardly displaced opening for receiving and containing food and for allowing the animal to eat the food from upper reservoir 16. In one configuration of the present invention, upper reservoir 16 has a generally square bottom 18 having sides approximately nine to eleven inches in length and four equally sized sidewalls 20 approximately three to five inches high. Fixedly attached to the underside surface of bottom 18 of upper reservoir 16 in a generally downwardly projecting configuration is post 22. In one configuration, post 22 is a generally elongated cylindrical member approximately one and one half to three inches long and approximately three to four inches in diameter that is sized and configured to be cooperatively but removably engaged by watering component 14, as set forth in more detail below.

Although upper reservoir 16 and post 22 can be made out of a variety of materials, the preferred materials are those that are sufficiently corrosion resistant to prevent premature material failure or damage (i.e., rust) to feeding component 12, from both the outdoor elements and the food placed therein, and to adequately support the animal food that will be placed in upper reservoir 16. Materials such as stainless steel, plastics, fiberglass, composites, certain metals and various coated materials (i.e., powder coated steel) will be generally sufficient. Relatively lightweight, but strong, materials are generally preferred so that the user may reasonably move apparatus 10 from one location to another, as desired. Although upper reservoir 16 is described as being generally square shaped and post 22 being cylindrically shaped, those skilled in the art will understand that upper reservoir 16 and post 22 could be any number of shapes and made in a number of different sizes. Post 22 can be welded, bolted, threaded or otherwise attached to bottom 18 of upper reservoir 16 or integrally formed or molded with upper reservoir 16, generally depending on the materials and method of manufacturing selected for apparatus 10.

In a preferred embodiment of apparatus 10 of the present invention, watering component 14 generally comprises a lower reservoir 24, upstanding post connector 26, water control system 28 and screen cover 30. In the preferred embodiment, lower reservoir 24 has a substantially horizontal bottom 32 which is bounded on its periphery by a plurality of generally vertically displaced sidewalls 34, such as the four shown in the figures. As best shown in FIG. 3, lower reservoir 24 can be formed into a generally square or rectangular-shaped compartment having an upwardly displaced opening for receiving and containing water and for allowing the animal to drink the water from lower reservoir 24. In one configuration of the present invention, lower reservoir 16 has a generally rectangular bottom 32 having sides approximately twenty to thirty inches in length by eleven to fifteen inches in width and four equally sized sidewalls 34 approximately three to five inches high. Post connector 26 is attached to and generally upwardly projecting from the upwardly facing surface of bottom 32 of lower reservoir 24. Post connector 26 is configured to receive post 22 so that upper reservoir 16 is held in a generally secure and level position, even when the animal is eating food from upper reservoir 16. In one configuration, post connector 26 is a generally elongated tubular member approximately three to four inches long and approximately three to five inches in outer diameter having an inner channel 36 that is sized and configured to cooperatively but removably engage post 22 of feeding component 12.

Although lower reservoir 24 and post connector 26 can be made out of a variety of materials, the preferred materials are those that are sufficiently corrosion resistant to prevent premature material failure or damage (i.e., rust) to watering component 14, from both the outdoor elements and the water or other fluid placed therein, and to adequately support feeding component 12 and the animal food that will be placed in upper reservoir 16. Materials such as stainless steel, plastics, fiberglass, composites, certain metals and various coated materials (i.e., powder coated steel) are generally sufficient. As with upper reservoir 16, lower reservoir 24 is preferably manufactured from relatively lightweight, but strong, materials so that the user may reasonably move apparatus 10 from one location to another. Although lower reservoir 24 is shown and described as being generally rectangular shaped and post connector 26 being generally cylindrically shaped, those skilled in the art will understand that lower reservoir 24 and post connector 26 could be any number of shapes and made in a number of different sizes. Preferably, lower reservoir 24 is sufficiently longer and/or wider than upper reservoir 16 such that the animal can easily obtain water from lower reservoir 24 even when post 22 of upper reservoir 16 is engaged in post connector 26 of lower reservoir 24. Post connector 26 can be welded, bolted, threaded or otherwise attached to bottom 32 of lower reservoir 24 or integrally formed or molded therewith, generally depending on the materials and method of manufacturing selected for apparatus 10.

Figure 1:
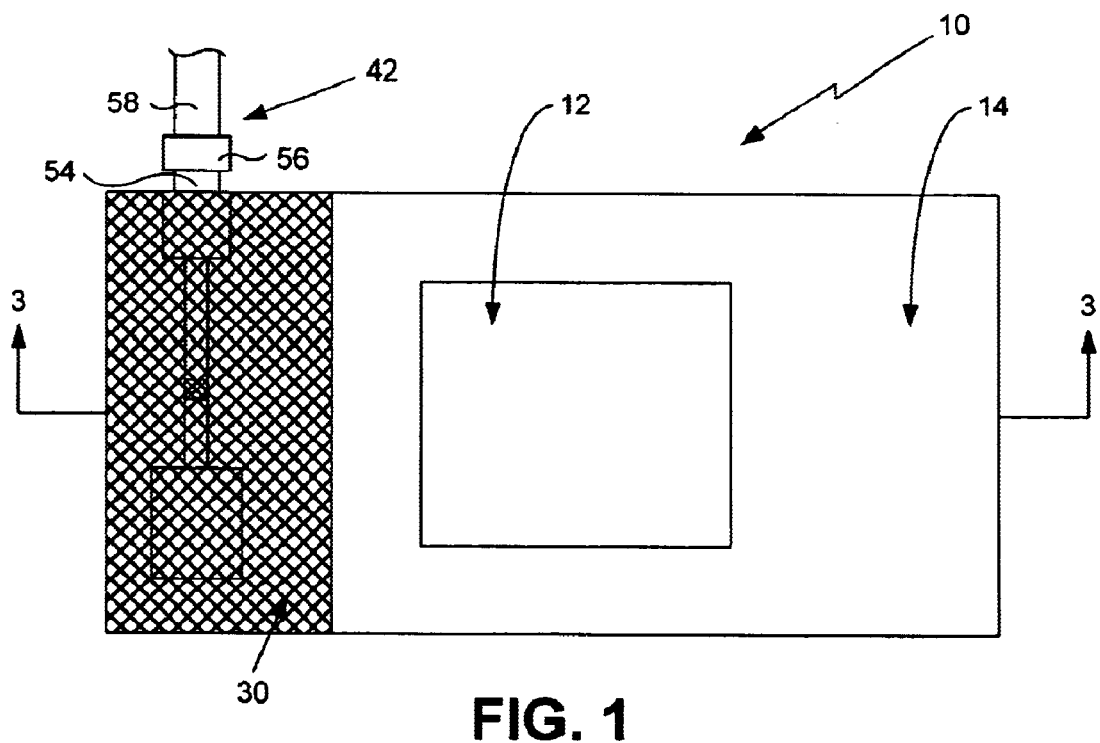
FIG. 1 is a top plan view of the animal feeding and watering apparatus of the present invention.
Figure 2:
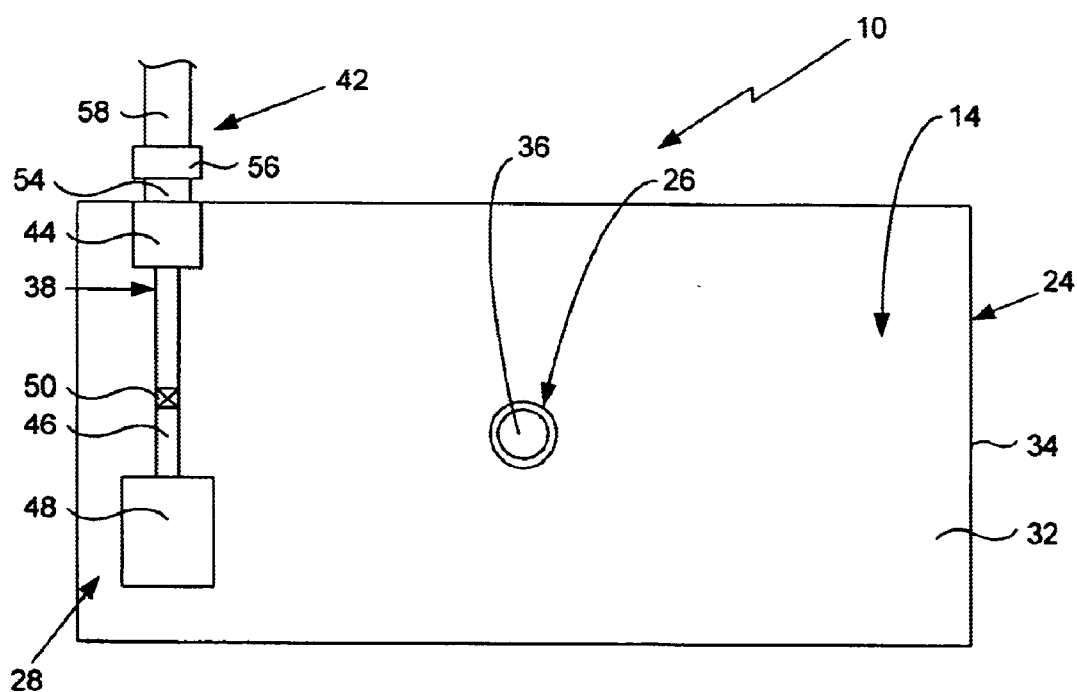
FIG. 2 is a top plan view of the animal feeding and watering apparatus of the present invention shown in FIG. 1, with the cover screen and upper reservoir removed.

In the preferred embodiment of the feeding and watering apparatus 10 of the present invention, as best shown in FIGS. 1 and 3, lower reservoir 24 has a screen cover 30 configured to cover and protect the working components of water control system 28. Screen cover 30 can extend across lower reservoir 24 from one sidewall 34 to another above the location in lower reservoir reserved for water control system 28. In addition, as best shown in FIG. 3, screen cover 30 can also extend to the bottom 32 of lower reservoir 24 to protect water control system 28 on the side opposite the nearest sidewall 34. The purpose of screen cover 30 is to keep animals, people and miscellaneous objects out of water control system 28 to prevent unintended adjustment of the water level in lower reservoir 24 and damage to water control system 28. Screen cover 30 can be made out of stainless steel, plastic, fiberglass, various coated and non-coated metals and other materials that are sufficiently corrosion resistant and strong. In the embodiment shown in the figures, screen cover 30 comprises a mesh pattern having openings therein. Alternatively, solid and/or transparent materials may be utilized for screen cover 30.

In the preferred embodiment, water control system 28 comprises a fluid level regulator 38, an inlet 40 and source of water 42 connected to inlet 40. In one embodiment, fluid level regulator 38 is a float control system comprising a float actuated fluid valve 44, actuator arm 46 and float 48. In the typical configuration, fluid valve 44 is disposed in or near inlet 40 and actuator arm 46 is operatively connected to fluid valve 44 at one end and connected to float 48 at the other end. As is well known in the art, as float 48 moves up and down, thereby moving actuator arm 46 up and down, actuator arm 46 operates fluid valve 44 so as to let water in through fluid valve 44 or to close it to prevent additional water from flowing in. To allow the animal's owner or caretaker to chose or change the water level desired in lower reservoir 24, the preferred fluid level regulator 38 has an adjustment mechanism 50 interposed within a bifurcated portion of actuator arm 46 to adjustably change the position of float 48 relative to valve 44 and lower reservoir 24 so as to control the water level in lower reservoir 24. One such adjustment mechanism 50 is a thumb screw that threadably engages the bifurcated portion of actuator arm 46 to allow float 48 to be pivoted relative to the adjustment mechanism 50 and then locked into the desired position.

In the preferred embodiment, inlet 40 comprises an opening 52 in one of sidewalls 34 of lower reservoir 24 with hose connector 54 disposed in opening 52 and configured to releasably attach to source of water 42 and fluid valve 44. In the configuration shown in the figures, hose connector 54 is configured with a male threaded end adapted to be threadably engaged by female threaded connector 56 on hose 58, which connects at its opposite end to any suitable water supply system, such as a standard pipe fitting attached to a domestic water faucet in the usual manner. In this configuration, the owner or caretaker of animals utilizing the apparatus 10 of the present invention to feed and water animals can thread connector 56 of a standard garden type hose 58, which is commonly available in the back yards or adjacent outdoor areas of most homes, onto hose connector 54. Because no special plumbing or other equipment is necessary, the preferred apparatus 10 is readily adaptable to easy use by most persons. If desired, the source of water 42 can be a private or city well, sprinkler system or other water supply system and hose 58 can be fixedly and/or permanently (i.e., with a barbed-type connector or integrally formed) connected to the source of water 42 and/or inlet 40, thereby eliminating connectors 52 and 54.

In use with the preferred embodiment of apparatus 10 of the present invention, the user of apparatus 10 places lower reservoir 24 at the location where it is desired to provide food and water to the user's animals. Hose 58 from source of water 42 is brought over to apparatus 10 and the female-threaded connector 56 of hose 58 is threaded onto the male-threaded hose connector 54, or otherwise engaged therewith, at inlet 40. Water from the source of water 42 is allowed to flow to lower reservoir 24. As water fills lower reservoir 24, the user can move float 48 up or down, utilizing adjustment mechanism 50, to select the desired water level for lower reservoir 24. After the fluid level regulator 38 is set, the user places screen cover 30 on lower reservoir 24 above and to the side of water control system 28, as shown in FIG. 3. Post 22 of upper reservoir 16 is lowered into inner channel 36 of post connector 26 in lower reservoir 24. Once upper reservoir 16 is in place, food may be deposited into upper reservoir 16. Because of the water in lower reservoir 24, crawling insects such as ants and the like will not be able to get into and contaminate the food in upper reservoir 16. As the animal drinks water from lower reservoir 24 and water is lost to evaporation, causing the water level in lower reservoir 24 to drop, fluid level regulator 38 of water control system 28 will be activated to allow water from source of water 42 to replenish the water in lower reservoir 24. In the preferred embodiment, float 46 will lower, causing actuator arm 46 to activate fluid valve 44 and allow water to flow through inlet 40 into lower reservoir 24. As soon as float 46 rises to the level previously selected so as to obtain the desired water level, actuator arm 46 will cause fluid valve 44 to shut-off, thereby preventing water from overflowing lower reservoir 24. With the addition of food to upper reservoir 16, apparatus 10 can supply food and water to animals as long as desired.

In an alternative embodiment of apparatus 10 of the present invention, sidewalls 20 of upper reservoir 16 have upper lip 60 extending outwardly from sidewalls 20 and sidewalls 34 of lower reservoir 24 have lower lip 62 extending outwardly from sidewalls 34 to make it easier for the animal's owner or caretaker to lift and carry upper reservoir 16, lower reservoir 24 and feeding and watering apparatus 10. In another alternative embodiment, apparatus 10 includes or can be used with an automated feeding apparatus (not shown) that is configured to automatically supply food to upper reservoir 16 as it is eaten -therefrom or on a routine (i.e., timed) basis. In this manner, apparatus 10 of the present invention can be used to provide food and water to animals on an extended basis, particularly when the owner/caretaker will be away from the home for some time.

Figure 5:
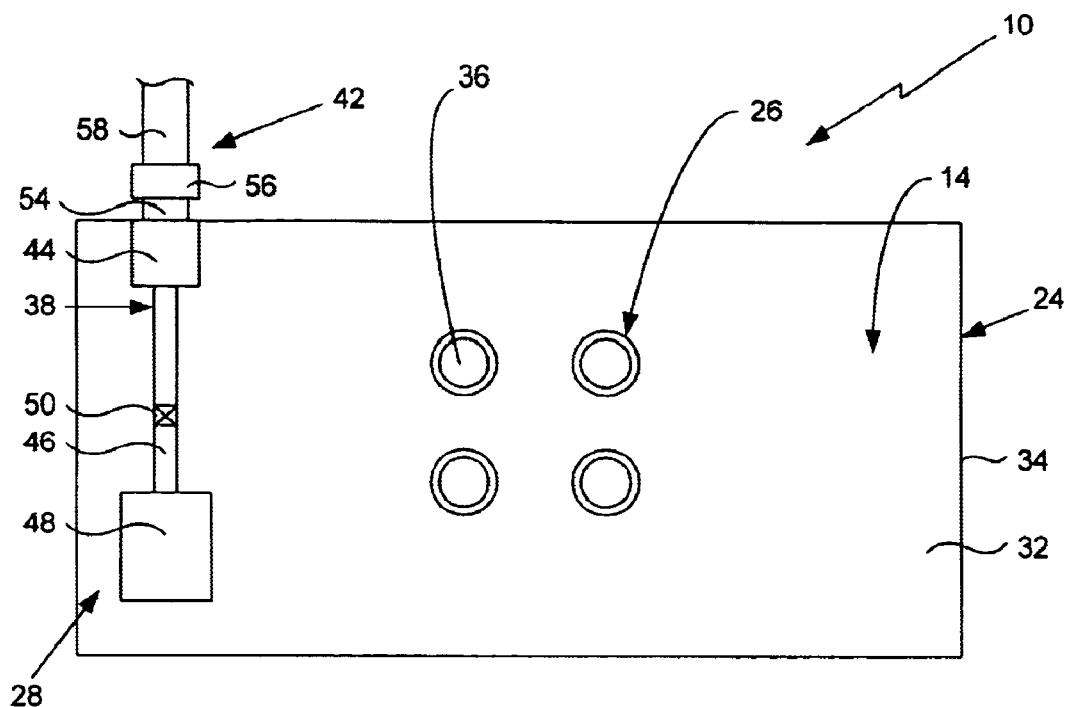
FIG. 5 is a top plan view of the animal feeding and watering apparatus of an alternative embodiment of the present invention with the cover screen and upper reservoir removed.
Figure 6:
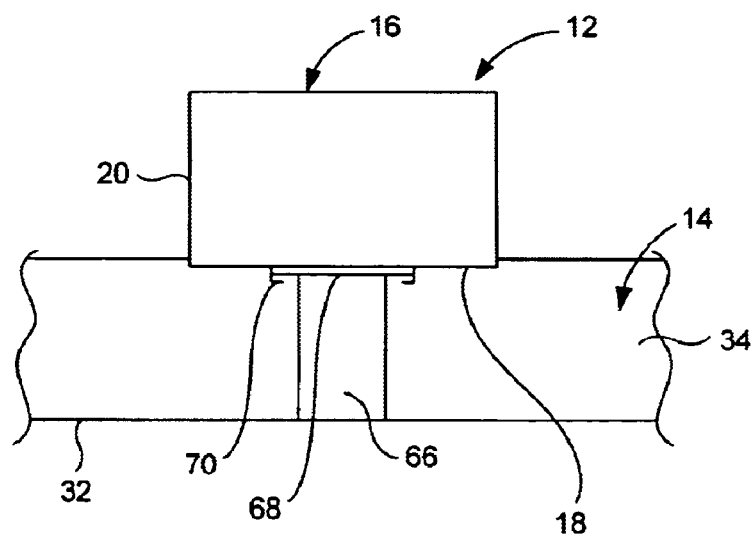
FIG. 6 is a partial side section view similar to FIG. 3 of another alternative embodiment of the animal feeding and watering apparatus of the present invention.

In yet another alternative configuration of apparatus 10 of the present invention, feeding component 12 can comprise more than one post 22 at the bottom 18 of upper reservoir 16 that are configured to operatively engage with a like number of post connectors 26 in lower reservoir 24, such as the four post connectors 24 shown in FIG. 5. Various other configurations of a support mechanism 64 to removably support upper reservoir 16 above lower reservoir 24 are also possible. For instance, as shown in FIG. 6, the support mechanism 64 can comprise a single post 66 in lower reservoir 24 that has a generally horizontally disposed plate 68 at the top thereof that is sized and configured to receive and engage a clip member 70 on the bottom 18 of upper reservoir 16. In this configuration, clip member 70 slides onto plate 68 to engage upper reservoir 16 on post 66 to complete apparatus 10. As well know by those skilled in the art, the support mechanisms 64 described above can be reversed, such that the post portion 22 of the first-described support mechanism 64 is in the lower reservoir and the post receiver 26 is attached to the bottom 18 of upper reservoir 16 to slide over post 22, and plate 68 can be on the bottom 18 of upper reservoir 16 to slide into a clip member 70 attached to one or more posts 66 in lower reservoir 24. Various other configurations for support mechanism 64 are also possible.

As stated above, upper reservoir 16 and lower reservoir 24 can be made out of a variety of different materials and in a variety of different shapes and sizes (generally depending on the size and/or number of animals). The primary material consideration is weight, corrosion resistance and strength. If animals chewing on apparatus 10 is a concern, then apparatus 10 should be made out of metal or other material that is generally resistant to chewing. The primary size consideration is that upper reservoir 16 must be sufficiently smaller than lower reservoir 24 so the animal may get its mouth or head to the water in lower reservoir 24 without necessarily contacting upper reservoir 16. Sidewalls 20 of upper reservoir 16 and sidewalls 34 of lower reservoir 24 can be generally vertical or sloped as may be desired.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A feeding and watering apparatus for supplying food and water to one or more animals, said apparatus comprising:
   a feeding component having an upper reservoir with a bottom and a plurality of generally upstanding sidewalls connected to said bottom, said upper reservoir configured to receive and contain food therein;
   a watering component having a lower reservoir with a bottom and a plurality of generally upstanding sidewalls connected to said bottom, said lower reservoir having a support mechanism configured to support said upper reservoir above said lower reservoir, said support mechanism having a plate member attached to one or more post members projecting upwardly from said bottom of said lower reservoir and one or more clip members attached to said upper reservoir, said plate member sized and configured to substantially fit within said clip member and support said upper reservoir on or above said plate member, said lower reservoir sized configured to store water therein, to allow said one or more animals to access the water in said lower reservoir without substantially contacting said upper reservoir and to prevent infestation of crawling insects into the food in said upper reservoir; and
   a water control system attached to said lower reservoir, said water control system having a fluid level regulator operatively connected to a supply of water to automatically maintain a predetermined level of water in said lower reservoir.

2. The apparatus according to claim 1, wherein said feeding component is detachable from said watering component.

3. The apparatus according to claim 1, wherein said water control system comprises an inlet in one of said plurality of said upstanding sidewalls of said lower reservoir, said inlet having a connector adapted to connect said fluid level regulator to said supply of water.

4. The apparatus according to claim 1, further comprising a cover over said fluid level regulator in said lower reservoir.

5. feeding and watering apparatus for supplying food and water to one or more animals, said apparatus comprising:
   a feeding component having an upper reservoir with a bottom and a plurality of generally upstanding sidewalls connected to said bottom, said upper reservoir configured to receive and contain food therein;
   a watering component having a lower reservoir with a bottom and a plurality of generally upstanding sidewalls connected to said bottom, said lower reservoir having a support mechanism configured to support said upper reservoir above said lower reservoir, said support mechanism having a plate member attached to said upper reservoir and one or more clip members attached to one or more post members projecting upwardly from said bottom of said lower reservoir, said plate member sized and configured to substantially fit within said clip member and support said upper reservoir on or above said plate member said lower reservoir sized configured to store water therein, to allow said one or more animals to access the water in said lower reservoir without substantially contacting said upper reservoir and to prevent infestation of crawling insects into the food in said upper reservoir; and
   a water control system attached to said lower reservoir, said water control system having a fluid level regulator operatively connected to a supply of water to automatically maintain a predetermined level of water in said lower reservoir.

6. The apparatus according to claim 5, wherein said feeding component is detachable from said watering component.

7. The apparatus according to claim 5, wherein said water control system comprises an inlet in one of said plurality of said upstanding sidewalls of said lower reservoir, said inlet having a connector adapted to connect said fluid level regulator to said supply of water.

8. The apparatus according to claim 5 further comprising a cover over said fluid level regulator in said lower reservoir.

* * * * *